United States Patent Office 3,078,147
Patented Feb. 19, 1963

3,078,147
FERROMAGNETIC CHROMIUM OXIDE
AND PREPARATION
Norman L. Cox, Claymont, Del., assignor to E. I. du Pont de Nemours and Company, Wilmington, Del., a corporation of Delaware
No Drawing. Filed June 5, 1959, Ser. No. 818,271
3 Claims. (Cl. 23—145)

This invention relates to novel ferromagnetic materials. More particularly, this invention relates to dense masses of ferromagnetic chromium oxide and to a method for their preparation.

For certain applications, e.g., permanent magnets and coil cores, ferromagnetic materials must be prepared in the form of dense masses. With ferromagnetic metals and alloys, fabrication is readily accomplished by known metallurgical techniques, such as melting. However, ferromagnetic oxides are not readily susceptible to fabrication by these methods and it is usually necessary to employ powder metallurgy techniques in the preparation of massive shaped objects from such oxides. In order to obtain objects with densities approaching the theoretical density, high pressures, e.g., 100 tons/sq. in., must be employed for compaction and sintering temperatures in excess of 1000° C. are usually required. Ferromagnetic chromium oxide is thermally unstable at such temperatures.

Moreover, in achieving high densities, it is usually necessary to employ a binder or lubricant for the powder which remains in the finished object as an impurity or, if it is removed by volatilization at high temperature, leaves minute voids and may react with the magnetic oxide forming undesired by-products.

Now it has been found that dense masses of ferromagnetic chromium oxide in a state of high purity can be prepared by the thermal decomposition of chromyl chloride in the presence of ferromagnetic chromium oxide of at least 90% purity. By disposing the initial ferromagnetic chromium oxide in the mold of the shape desired for the final product, shaped objects or structures composed of ferromagnetic chromium oxide of at least 90% purity can be produced directly. Such objects are an embodiment of this invention.

The presence of ferromagnetic chromium oxide of at least 90% purity in the reaction zone is necessary for the production of high quality, dense products. This ferromagnetic chromium oxide, hereinafter referred to as "seed material," also exerts a catalytic effect on the thermal decomposition of chromyl chloride enabling satisfactory dense products to be prepared at temperatures lower than would otherwise be possible.

The seed material may be particulate in form or it may consist of porous, massive, shaped objects. The use of particulate seed material leads to high rates of formation of ferromagnetic chromium oxide from chromyl chloride, particularly when powders having low bulk density are employed. Maximum rates of formation of ferromagnetic chromium oxide are obtained when the seed material is composed of acicular particles and has been treated, e.g., by sifting to reduce bulk density.

Ferromagnetic chromium oxides suitable for use as seed material are prepared by thermal decomposition of chromium trioxide at 225°–500° C. under 1–3000 atmospheres pressure and, if desired, in the presence of modifiers such as ruthenium, antimony, tin, iron or manganese compounds or rutile-type metal fluorides. The preparation of such products is described in French Patent 1,154,191 and in U.S. Patents 2,885,365, 2,923,683, and 2,923,684 and assignee's copending applications of Ingraham and Swoboda, S.N. 756,542, filed August 22, 1958, now U.S. 3,034,988, and 724,811, filed March 31, 1958, now U.S. 3,068,176.

For the preparation of objects having the highest densities, the seed material is desirably a porous, massive body of the desired shape, e.g., a body prepared by the process of this invention from powdered seed material.

The temperature at which the process of the present invention is carried out depends upon the seed material employed, but will usually be in the range of 300°–450° C. When seed material is used consisting of well-formed, relatively large crystals such as may have been obtained, for example, from previous operation of the present process, temperatures in the range above 400° C. are entirely satisfactory and good conversions to high quality products are obtained. With seed material of smaller particle size and particularly with highly acicular seed material modified with ruthenium, antimony, and the like, it is better to employ temperatures below 400° C. and preferably below 360° C. On the other hand, at temperatures below 300° C., the formation of ferromagnetic chromium oxide is slow and impure products are produced in low conversions. It is preferred that the reaction temperature be above 320° C.

For convenience, this process is normally carried out at approximately atmospheric pressure. However, it may sometimes be advantageous to employ pressures above or below atmospheric pressure to facilitate handling of chromyl chloride vapor. The pressure employed will normally be less than 5 atmospheres and usually greater than 0.5 atmosphere.

The products of this invention are massive bodies such as bars, slugs, cores, and the like, composed entirely of ferromagnetic chromium oxide of at least 90% purity. In order to provide adequate physical strength, such objects are at least 0.1 mm. in minimum dimension. These objects exhibit on X-ray examination a pattern characteristic of the rutile-type crystal structure of ferromagnetic chromium oxide having the cell constants $a_0 = 4.42 \pm 0.01$ A. and $c_0 = 2.92 \pm 0.01$ A.

The products of this invention exhibit a specific saturation per gram or sigma value, $\sigma_s$, as it is called, of at least 70 gauss cm.$^3$/gm. and usually in excess of 80 gauss cm.$^3$/gm. as determined at room temperature in a field of 2000 oersteds. Objects prepared from seed material of low coercivity, i.e., 50 oersteds and below, themselves exhibit low coercivity. When seed material of higher coercivity is employed, e.g., in the range of 225–280 oersteds, the resultant objects have coercivities in an intermediate range, e.g., 90–150 oersteds. The products of this invention have densities in excess of 4.15 g./cc. and the best products have densities in excess of 4.40 g./cc. The theoretical density of ferromagnetic chromium oxide calculated from X-ray data is 4.893 g./cc.

The products described in the preceding paragraphs consist of polycrystalline aggregates of ferromagnetic chromium oxide. It is also possible to produce large, single crystals of ferromagnetic chromium oxide by the process of this invention. That is, solid specimens can be prepared in which, throughout the entire volume, the atoms are arranged in an essentially unbroken lattice array of definite geometric symmetry. Such objects are of use in the precise determination of crystalline structure and in the fabrication of elements for microwave circuitry.

The process of this invention may be carried out in any equipment which provides for the exposure of chromyl chloride to the desired temperature in the presence of ferromagnetic chromium oxide of at least 90% purity. The process is conveniently carried out in a tube which may be constructed of Pyrex glass, quartz, corrosion-resistant metals, or other materials inert to chromyl chloride, and chlorine at the temperatures involved. One end of the tube is provided with gas inlets and the other end with a gas outlet connected to a suitable vent. If desired, provision may be made for removal and recycling of unconverted chromyl chloride in the exit gases. The reaction tube is placed in an electrically heated furnace which provides the heat required. The temperature of the tube is measured by one or more thermocouples arranged along the tube. For ease and precision in temperature control, it is desirable that the furnace have several heating elements spaced along its length.

Chromyl chloride vapor for use in this process may be produced by dropping liquid chromyl chloride into a vessel maintained at a temperature somewhat above its boiling point. Such a temperature is conveniently maintained by surrounding the vessel with boiling hexachloroethane vapor. Alternatively, chromyl chloride vapor may be introduced into the reaction tube by using an entraining agent such as oxygen, or air, which is bubbled through liquid chromyl chloride maintained at a temperature which provides the desired vapor pressure.

The ferromagnetic chromium oxide seed material is placed within the heated portion of the reaction tube. When the seed material consists of a loose powder it may be placed in a container having a shape corresponding approximately to that desired in the final massive ferromagnetic chromium oxide article. Containers constructed of quartz, glazed porcelain and platinum have proven very satisfactory. After deposition of ferromagnetic chromium oxide has occurred to a sufficient extent that the massive article can be removed from the container without fracture, it is desirable that further treatment be conducted without a container to increase contact between the article and chromyl chloride vapor. Such massive articles are conveniently supported on frames constructed from platinum wire or quartz or may rest directly on the wall of the reaction tube.

The magnetic properties of the products of this invention may be determined on the massive articles or on powders obtained by grinding these articles to small particle size. The magnetic properties which render the products particularly useful are the intrinsic coercive force, $H_{ci}$, and the specific magnetization or sigma value, $\sigma_s$. The definition of the intrinsic coercive force is given in Special Technical Publication No. 85 of the American Society for Testing Materials, entitled "Symposium on Magnetic Testing" (1948), pp. 191–198. The values for the intrinsic coercive force given herein are determined on a D.C. ballistic-type apparatus which is a modified form of the apparatus described by Davis and Hartenheim in the Review of Scientific Instruments 7, 147 (1936). The sigma value, $\sigma_s$, is defined on pp. 7 and 8 of Bozorth's "Ferromagnetism," D. Van Nostrand Co., New York (1951). This sigma value is equal to the intensity of magnetization, $I_s$, divided by the density, $d$, of the material. The sigma values given herein are determined on apparatus similar to that described by T. R. Bardell on pp. 226–228 of "Magnetic Materials in the Electric Industry," Philosophical Library, New York (1955).

The chromyl chloride employed in this invention can be of the usual commercial purity and need not be especially purified. Since it is introduced to the reaction zone in the form of vapor, any adventitious solid impurities are necessarily removed and do not contaminate the reaction product.

The invention is illustrated further by the following examples in which the proportions of ingredients are expressed in parts by weight unless otherwise noted.

*Example I*

Pure ferromagnetic chromium oxide powder obtained by the hydrothermal decomposition of chromium trioxide, as described in French Patent No. 1,154,191, was placed loosely in a quartz combustion boat and introduced into the reaction zone of the apparatus described above. Oxygen was passed over the seed material while the temperature was raised to 360° C. A mixture of chromyl chloride and oxygen was then passed over the seed material for a period of 5 hours while the temperature was maintained at 360° C. At the end of the reaction period, the combustion boat was removed from the tube and found to contain ferromagnetic chromium oxide in the form of a hard bar. This bar had a density of 4.35 g./cc. which amounts to 89% of the theoretical value calculated from X-ray data. This bar was reduced to powder by grinding in an agate mortar. The powder which was at least 98% ferromagnetic chromium oxide had a specific magnetization, $\sigma_s$, of 89 gauss cm.$^3$/gm., measured in a field of 2000 oersteds. The X-ray pattern of this powder was that of ferromagnetic chromium oxide.

A portion of the above powder was employed as seed material for the preparation of additional ferromagnetic chromium oxide by treatment with chromyl chloride-oxygen mixture at 360° C. for 8 hours. During this period the seed material increased in weight by 116% and a bar was produced containing more than 90% ferromagnetic chromium oxide.

*Example II*

Pure ferromagnetic chromium oxide (3.65 g.) contained in a platinum boat was treated under the conditions described in Example I. The resulting bar weighed 8.13 g. corresponding to a weight gain of the seed material of 123% and had a specific saturation, $\sigma_s$, of 82 gauss cm.$^3$/gm. The bar was placed directly in the reaction tube and subjected to a second treatment at 360° C. The product was ferromagnetic chromium oxide of at least 95% purity having a density of 4.45 g./cc. (91% of theory). The specific saturation was 83.5 gauss cm.$^3$/gm.

*Example III*

Ferromagnetic chromium oxide contained in a platinum boat was treated according to Example I, except that a reaction temperature of 380–390° C. was maintained for a period of 8 hours. During this period the seed material gained 168% in weight and a bar was produced having a density of 90% of the theoretical. The specific magnetization of this chromium oxide, $\sigma_s$, was 84.2 gauss cm.$^3$/gm. measured in a field of 2000 oersteds and the purity was greater than 95%.

A black deposit which collected on the thermocouple well constructed of Pyrex glass during this run was scraped off and found to have a specific magnetization, $\sigma_s$, of only 10.8 gauss cm.$^3$/gm.

*Examples IV–VI*

These examples illustrate the preparation of ferromagnetic chromium oxide from chromyl chloride-oxygen mixtures at temperatures of 300°, 320° and 340° C. The seed material was the same as that employed in Example I and was contained in platinum boats. Reaction conditions were maintained for 8 hours, after which the specimens were removed and their properties determined as shown in the following table.

| Specimen | Temp. (° C.) | Wgt. Gain (Percent) | Specific Magnetization (gauss cm.$^3$/g.m) | Coercive Force $H_{ci}$ (oersteds) | Purity of Ferromagnetic Oxide (Percent) |
| --- | --- | --- | --- | --- | --- |
| 1 | 340 | 187 | 83.5 | 39 | >90 |
| 2 | 320 | 116 | 87.4 | 33 | >95 |
| 3 | 300 | 68 | 86.4 | 32 | >95 |

A bar similar to specimen 1 above was subjected to a second treatment for 8 hours at 340° C. No boat was employed during this treatment. The product was a ferromagnetic chromium oxide bar having a density (4.43 g./cc.) corresponding to 91% of theory. A deposit formed on the Pyrex thermocouple well and the interior walls of the Pyrex combustion tube was entirely nonmagnetic.

Example VII

This example illustrates the use of acicular antimony modified ferromagnetic chromium oxide powder prepared according to procedure given in U.S. Patent 2,923,683. This seed material was exposed to a mixture of chromyl chloride and oxygen for a period of 8 hours at 360° C. as described in Example I, and gained 275% in weight during this period. The product was ferromagnetic chromium oxide of purity greater than 90%. The specimen was returned to the apparatus for an additional 8-hour period. The resultant hard ferromagnetic chromium oxide bar had a density of 4.36 g./cc., corresponding to 89% of theory.

Examples VIII–X

These examples illustrate the preparation of ferromagnetic chromium oxide by the decomposition of chromyl chloride in the presence of air at temperatures of 300°, 320°, and 340° C. using the acicular ferromagnetic chromium oxide described in Example VII as seed material. A reaction period of 8 hours was employed. The gain in weight and the purity of the ferromagnetic chromium oxide produced are indicated in the following table. For specimens marked with an asterisk, the seed material was passed through a 200-mesh screen prior to use to reduce bulk density.

| Specimen | Temp. (° C.) | Wgt. Gain (Percent) | Coercive Force $H_{ci}$ (oersteds) | Purity of Ferromagnetic Chromium Oxide (Percent) |
|---|---|---|---|---|
| 1 | 340 | 301 | 100 | >90 |
| 2* | 340 | 628 | 89 | >90 |
| 3 | 320 | 211 | 112 | >95 |
| 4* | 300 | 293 | 120 | >90 |

A small amount of deposit formed on the glass walls of the combustion tube during the preparation of these products was non-magnetic.

This invention provides a process for the preparation of dense masses of ferromagnetic chromium oxide which is readily carried out in simple equipment and does not require high pressures nor extremely high temperatures. The products are easily prepared in shapes suitable for various uses and, if desired, can be machined to form objects having utility in the fabrication of coil cores, permanent magnets, electromagnets and the like.

The embodiments of the invention in which an exclusive property or privilege is claimed are defined as follows:

1. A process which comprises disposing ferromagnetic chromium oxide of at least 90% purity in a reaction zone and thereafter thermally decomposing chromyl chloride at a temperature of 300 to 450° C. in the presence of said ferromagnetic chromium oxide of at least 90% purity.

2. A process for preparing shaped objects of ferromagnetic chromium oxide of a least 90% purity which comprises disposing ferromagnetic chromium oxide of at least 90% purity in a mold of the shape desired for the final object and thereafter thermally decomposing chromyl chloride at a temperature of 300 to 450° C. in the presence of said oxide.

3. In the process for producing shaped objects of ferromagnetic chromium oxide of 90% purity at a temperature of 300 to 450° C. by the thermal decomposition of chromyl chloride, the improvement which consists of carrying out the process in the presence of a seed material comprising ferromagnetic chromium oxide of at least 90% purity, said seed material being present initially.

References Cited in the file of this patent

UNITED STATES PATENTS

| | | |
|---|---|---|
| 2,263,623 | Gertler | Nov. 25, 1941 |
| 2,592,598 | Perrin | Apr. 15, 1952 |
| 2,885,365 | Oppegard | May 5, 1959 |

FOREIGN PATENTS

| | | |
|---|---|---|
| 1,154,191 | France | Oct. 28, 1957 |

OTHER REFERENCES

Michel et al., Bulletin de la Societe Chimique de France, 5E Serie, vol. 10, 1943, pages 315–322.

A Comprehensive Treatise on Inorganic and Theoretical Chemistry, by Mellor, vol. 6, pp. 238, 240, pub. by Longmans, Green, London (1925).